United States Patent [19]

Feldewert

[11] Patent Number: 4,680,846
[45] Date of Patent: Jul. 21, 1987

[54] MATERIAL SAVING METHOD FOR TRUING TRACK WHEELS

[75] Inventor: Herbert Feldewert, Erkelenz, Fed. Rep. of Germany

[73] Assignee: Wilhelm Hegenscheidt GmbH, Erkelenz, Fed. Rep. of Germany

[21] Appl. No.: 859,039

[22] Filed: May 2, 1986

[30] Foreign Application Priority Data

May 17, 1985 [EP] European Pat. Off. ........ 85106088.9

[51] Int. Cl.$^4$ .............................................. B21H 1/04
[52] U.S. Cl. .................................... 29/168; 29/402.19
[58] Field of Search ................ 29/402.19, 402.21, 168, 29/159.01, 803

[56] References Cited

U.S. PATENT DOCUMENTS

| 969,275 | 9/1910 | Hansen | 29/168 |
| 1,722,389 | 7/1929 | Opie et al. | 29/402.21 |
| 3,535,906 | 10/1970 | Swick et al. | 72/342 |

FOREIGN PATENT DOCUMENTS

| 712710 | 10/1941 | Fed. Rep. of Germany . |
| 945087 | 12/1963 | Fed. Rep. of Germany . |
| 7899 | 12/1909 | United Kingdom . |
| 117650 | 7/1918 | United Kingdom . |
| 394544 | 6/1933 | United Kingdom ................ 29/168 |

*Primary Examiner*—Percy W. Echols
*Attorney, Agent, or Firm*—W. G. Fasse; D. H. Kane, Jr.

[57] ABSTRACT

Track wheels, especially railroad wheels, are trued in a material saving manner by first displacing material from zones of lesser wear to zones of higher wear on the wheel tread and/or on the wheel flange including the flank area of the flange, especially that part of the flank merging the flange into the tread zone. The location of the new or restored tread is then determined and a material removing operation such as milling or turning is performed. The material displacing may be performed by a rolling or forging operation prior to the milling or turning operation.

9 Claims, 2 Drawing Figures

MATERIAL SAVING METHOD FOR TRUING TRACK WHEELS

FIELD OF THE INVENTION

The invention relates to a material saving method for truing track wheels, especially railroad wheels. Such wheels have, in addition to a hub and spokes, a rim including a tread section and a flange section. The flange includes a flank facing toward the tread section and merging the flange section into the tread section. The flange section and the tread section form together a profile which in a new wheel must conform to the dimensions of a reference profile. Such wheels may be trued individually or as wheel sets.

DESCRIPTION OF THE PRIOR ART

Methods for correcting the profile of a track wheel are well known, wherein at least those zones of the profile which deviate from the above mentioned reference profile are corrected by a material removing operation. Reference is made to an article entitled: "The Profile Correction of the Locomotive Wheel Rim" in the periodical (Werkstattechnik), 1965, No. 2, pages 69 to 74. Especially FIG. 9 of this article shows the different wear and tear conditions of the profile of a railroad wheel. The dashed line represents the original or new profile corresponding to the reference profile. The thick full line represents the worn profile. The thinner full line below the thick full line, represents the profile resulting from a correcting truing operation performed as a material removing operation such as a milling operation or a turning operation. It will be noted that a very large quantity of wheel material must be removed in order to achieve again a corrected profile, especially where the main zone of wear is located in the wheel flange. The material to be removed by the truing operation is, however, rather expensive. Therefore, the quantity of material to be removed in a truing operation should be minimized. Further, not only the material to be removed is expensive, the time needed for removing large quantities of material is also a substantial cost factor. Yet another disadvantage of removing large quantities of wheel material is seen in that the removed material is not available any more for the wear and tear to which the trued wheel will be exposed. Thus, large quantities of wheel material removed as a result of a truing operation actually reduce the total useful life of such track wheels.

As a result, efforts have always been made heretofore to minimize the quantity or volume of the material that needs to be removed in order to correct the profile of a railroad wheel. Thus, efforts have been made to locate the radial position of the profile to be newly made by the truing operation in the radial direction in such a way that it coincides at least at one point with the worn profile. This point is clearly recognizable in FIG. 9 of the above mentioned article in the flank area of the wheel flange where the flange merges into the tread. In order to be sure not to remove more material than necessary, prior art methods have paid attention to not machining a narrow strip running all around the new profile in the mentioned flank area where the new profile coincides with the worn profile. This prior art method reduces the material quantity to be removed but does not provide an optimal approach to the problem. As a result, efforts have been made heretofore to replace worn away material by a welding operation, especially when the worn away sections are in the wheel or rim flange. These welding operations, however, require a rather expensive technology and are using up material in the form of expensive welding electrodes. Additionally, the subsequent truing operation again removes some of the material that first must be welded onto the worn away sections. The milling of the welded material is difficult and time consuming. Thus, the method employing a preliminary welding operation has also not found wide spread acceptance.

OBJECTS OF THE INVENTION

In view of the foregoing it is the aim of the invention to achieve the following objects singly or in combination:

to provide a method for truing track wheels, especially railroad wheels in a material saving manner without the need of replacing worn away material, for example, by a welding operation;

to utilize at least part of the material that heretofore had to be removed by a milling or turning operation;

to increase the total useful life of such track wheels, especially railroad wheels; and to minimize the total volume of material that needs to be removed for the truing operation.

SUMMARY OF THE INVENTION

According to the invention a worn wheel is first subjected to a material displacing operation such as a rolling or forging operation for displacing material only from first zones of lesser wear into second zones of higher wear, whereby these second zones of higher wear are filled at least partially with material from the first zones of lesser wear. In order to do this, it is necerssary to first ascertain which are zones of lesser wear and which are zones of higher wear. The material displacement from zones of lesser wear into zones of higher wear is performed prior to determine radial locations requiring a material removal by a truing operation for producing a restored profile. The present material displacement has a great advantage in that material which, according to the prior art had to be partially removed by a milling or turning operation, is now utilized for filling up worn away zones and deformed zones or sections of the profile. The result of such material displacement is a material distribution, whereby it becomes possible to locate the radial position or location still requiring a material removal radially further outwardly as compared to performing a truing operation with reference to the location which is worn the most whereby the subsequent milling operation needs to remove substantially less material than was necessary in the prior art which uses the most worn location as a reference for the truing operation. Simultaneously, the material which has been displaced and does not need to be removed by a milling or turning operation becomes available for further wear and tear of the trued wheel so that the overall useful life of such wheels has been increased accordingly.

It has been especially troublesome to true track wheels in which the wear and tear is primarily in the wheel flange, whereby the flange flank facing the tread is worn away and deformed so that the axial thickness of the flange is reduced, although its radial dimension might even be increased, even to an extent exceeding the original radial dimension of the wheel flange. This type of wear and tear has been observed particularly on wheels that have been used on tracks with frequent curves. In such instances the wear and tear of the wheel flange can be rather large while the wear and tear in the tread section is relatively small. The reduction in the thickness of the wheel flange by wear and tear and by deformation then results in the need to locate the new profile or rather, the corrected profile to be produced by the truing operation radially inwardly to a substantial extent so that sufficient material will be available for the formation of the new wheel or rim flange. Thus, even more material might have to be removed also from the tread than would actually be necessary for a lesser worn wheel flange.

In a situation in which the wear is primarily or exclusively in the wheel flange, it becomes possible, according to the invention to deform the wheel flange at least partially in such a manner that the volume of the material to be removed for the restoration of the correct profile is minimized. This deformation thickens the wheel flange at least to such an extent that its thickness after the deformation corresponds to the flange thickness of the original profile. After this thickening of the wheel flange, the radial position of the new profile is determined and the required material removing operation is performed. This deformation for thickening the wheel flange means that, for example, the radial height of the wheel flange is reduced and such height reduction simultaneously increases the thickness of the wheel flange. The deformation itself may, for example, be a forging operation or a rolling operation. Since the material deforming displacement thickens the wheel flange, it is possible to determine a more favorable radial location of the new profile to be restored by a subsequent truing operation, whereby the volume of material to be removed by the truing operation is minimized.

In a situation in which the wear is primarily or exclusively in the wheel tread, such tread wear will determine the radial position of the profile to be restored. A wheel in which the wear is primarily a tread wear, the center region of the tread is worn down and the axially outer regions of the tread can be still almost unworn. Heretofore, it was necessary to completely mill off the unworn outer regions of the wheel tread for restoring the tread to a satisfactory new profile. Here again, the deformation and material displacement is such that material from tread zones having a larger diameter is displaced at least partially into tread zones having a smaller diameter, whereby the latter zones are at least partially filled with material which heretofore had to be removed by a milling or turning operation. The invention avoids this unnecessary material removal. After the material displacement is complete, the radial position of the profile to be restored is determined and the minimal material removal then still necessary is performed. Yet another advantage of the invention is seen in that the cutting depth of the truing operation can be substantially smaller than it has been in the prior art. This is so because the locations with a smaller diameter have been filled up with material from locations with a larger diameter. As a result, it is possible to locate the profile to be restored further outwardly in the radial direction and the quantity of material to be removed is minimized. Thus, the useful life of track wheels is increased.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
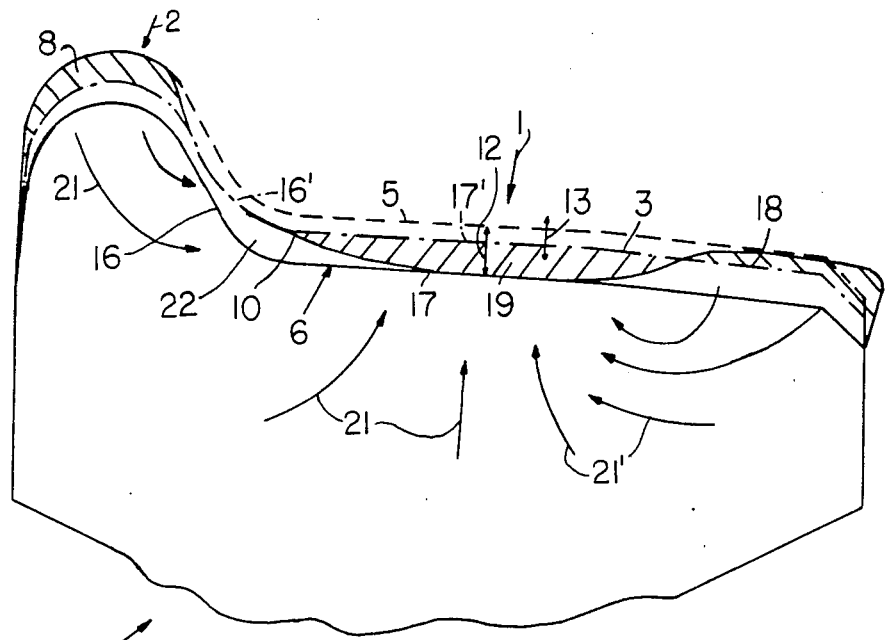
FIG. 1 illustrates a radial section through a railroad wheel rim which has been exposed primarily to wear in the tread section of the rim and wherein several different profiles are shown, whereby the rim proper is not hatched to avoid confusion with the several profiles.

FIG. 1 shows a track wheel rim R1 which has a tread section 1 and a flange section 2. In FIG. 1 it is the tread section 1 which is worn substantially while the flange section 2 is hardly worn at all. The dashed line 5 represents the original, new profile or contour of the new railroad wheel. The radially most inwardly located full line 6 represents a conventionally corrected wheel. The dash-dotted line 3 represents the worn down profile. Prior to the invention it was necessary to remove in the truing operation all the material between the conventionally corrected profile 6 and the worn profile 10.

The material conventionally removed by wear and the truing is shown at 12 in FIG. 1. Substantially less material needs to be removed by the truing operation according to the invention because the restored or corrected profile 3 shown by a dash-dotted line can now be located substantially further radially outwardly as compared to radial location of the conventionally corrected profile 6. This feature has become possible by pushing or forcing material from zones of lesser wear into zones of higher wear. A zone 8 of lesser wear is shown at the top of the wheel flange 2. A further zone 18 of lesser wear is shown along the wheel tread 1 at its portion axially opposite the wheel flange 2. The arrows 21 in FIG. 1 show the displacement of material from the zone 8 into the zone 19 of highest wear in the tread section 1. The arrows 21' show the displacement of the material from the zone 18 into the zone 19. This initial material displacement according to the invention reduces the severity of the wear in the central tread zone, whereby the subsequent truing operation can be performed by removing less material than was necessary heretofore. It will be appreciated, that the quantity of displaced material will depend on the quantity of material removed by wear. Thus, it may not be necessary to displace material from the wheel flange 2 and from the axially outer tread portion shown at 18. Material displacement from one or the other zone 8 or 18 may be sufficient. In any event, the zone 19 will be raised radially outwardly by the material displacement and such raising will be performed to an extent sufficient to permit a minimal material removal in the subsequent milling or turning operation. The material displacement itself may be performed by a rolling or forging operation.

The conventionally corrected profile 6 has a running surface 17 in its tread section and a flank surface 16 merging the flange section into the tread section. Similarly, the profile 3 corrected according to the invention has a running surface 17' and a flank surface 16' between the flange and the running surface. It will be noted that the restored running surface 17' according to the invention is located much closer to the original tread surface 5 as indicated by the spacing 13, compared to the spacing 12 mentioned above that is required for a restoring in the conventional manner. This substantial reduction in wasted material resulting from the truing operation is accomplished according to the invention even without the addition of new material such as was the case where material was welded onto the worn surfaces of a wheel rim in the prior art.

Figure 2:
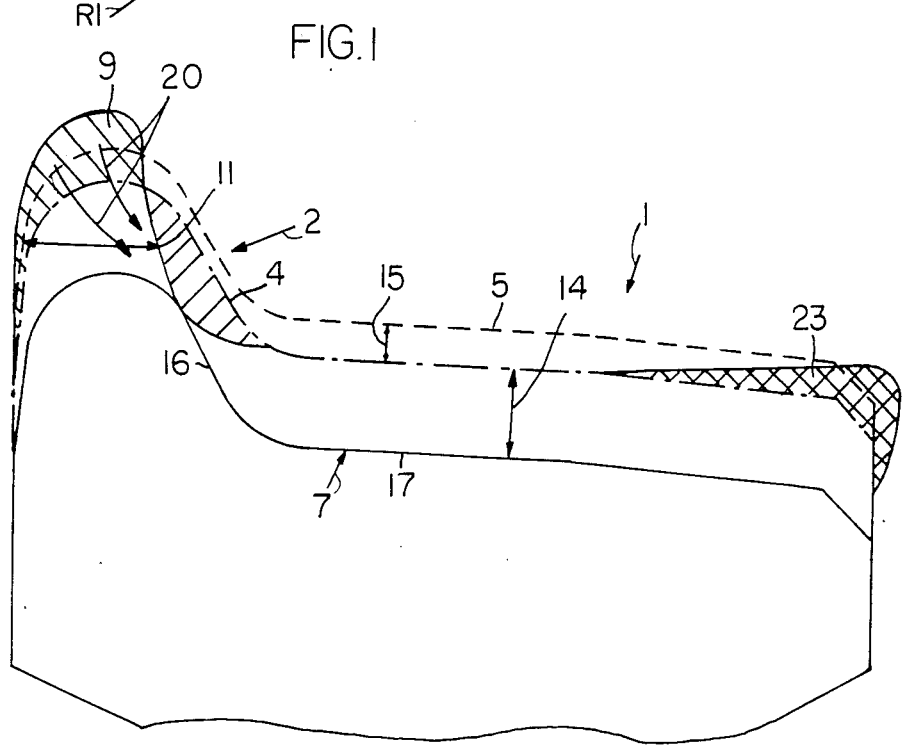
FIG. 2 is a view similar to that of FIG. 1, but showing a rim which was subjected primarily to wear in the flange section of the rim.

In FIG. 2 the tread section 1 of the rim R2 is hardly worn, whereas the flange section 2 is worn very substantially to the extent of reducing the flange section 2 in its axial thickness 1 and even lengthening the flange section in the radially outward direction as indicated at 9. Here again, the dashed line 5 indicates the original profile of the new wheel while the full line 7 designates the profile corrected in a conventional manner to produce a restored tread surface 17 and a restored flange flank 16. The dash-dotted line 4 designates the profile 4 restored according to the invention. It will be noted that a substantial quantity of material 14 needs to be removed in the conventional manner because the thinner and radially deformed wheel flange 2 had to be removed heretofore in order to provide the required flange thickness as shown at 16 compared to the worn out flange thickness 11. Contrary thereto according to the invention, only a small material quantity needs to be removed in the truing step following the material displacement step. According to the invention, material from the deformed flange portion 9 is moved by a rolling or forging operation in the direction of the arrows 20 to make the flange thicker as shown between the full line thickness 11 and the dash-dotted line portion 4. Thus, according to the invention the material displacement in the flange section does not call for any material removal in this area and the new profile or corrected profile 4 can be located much closer to the original profile 5 as shown at 15. Material removal that is necessary in this instance is the material in the zone 23 indicated by cross-hatching in FIG. 2. Very little material removal by a machining or turning operation takes place in the flange section and in most of the tread section in the example of FIG. 2.

The material displacement taught by the invention substantially reduces the material removal as compared to the prior art. Further, the invention does not require any addition of material, for example, by a welding operation. The invention saves material and thus increases the useful life of wheels trued according to the present teaching.

Although the invention has been described with reference to specific example embodiments, it will be appreciated, that it is intended to cover all modifications and equivalents within the scope of the appended claims.

What I claim is:

1. A method for making a restored track wheel by restoring a worn track wheel having a worn peripheral profile with a tread section and with a flange section, so that the restored track wheel will have a restored peripheral profile, comprising the following steps: ascertaining on said worn peripheral profile first worn zones of lesser wear, ascertaining on said worn profile second worn zones of higher wear, subjecting only said first zones of lesser wear to a material displacing deformation for forcing material out of said first zones into said second zones for forming a partially restored profile, determining on said partially restored profile locations requiring a material removal by a truing operation for producing said restored profile, and performing a material removing truing operation on said determined locations for obtaining said restored profile, whereby the quantity of material to be removed by said truing operation is minimized.

2. The method of claim 1, wherein said second zones of higher wear are located primarily in said flange section resulting in a flange having a reduced thickness relative to said restored profile, comprising deforming said flange section for increasing the flange thickness in said second zones of higher wear by displacing material from said first zones into said second zones, and then performing said location determination and said material removing truing operation.

3. The method of claim 2, wherein said material displacing deformation is performed primarily in a flank area connecting said tread section and said flange section.

4. The method of claim 3, wherein said material displacing deformation takes place in a substantially radial axial direction in said flank area of said flange section.

5. The method of claim 1, wherein said second zones of higher wear are located primarily in said tread section, comprising deforming only sections of lesser wear of said tread section for displacing tread section material from locations having a larger tread diameter into locations having a smaller tread diameter whereby said locations of smaller tread diameter are filled at least partially, and then performing said location determination and said material removing truing operation.

6. The method of claim 5, wherein said material displacing reduces the difference in the diameters of larger diameter tread locations and smaller diameter tread locations.

7. The method of claim 6, wherein said material displacing takes place in a substantially radial and axial direction in said tread section.

8. The method of claim 1, wherein said material displacing deformation is performed as a rolling operation.

9. The method of claim 1, wherein said material displacing deformation is performed as a forging operation.

* * * * *